(12) United States Patent
Kumar et al.

(10) Patent No.: US 8,775,532 B1
(45) Date of Patent: Jul. 8, 2014

(54) METHOD AND SYSTEM FOR SYNCHRONIZING MESSAGES ACROSS MULTIPLE DIGITAL MESSAGE ACCOUNTS

(75) Inventors: Anil Kumar, Spotswood, NJ (US); Damodaram Bashyam, Irvine, CA (US); Kristi Crum, Mendham, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 172 days.

(21) Appl. No.: 13/084,455

(22) Filed: Apr. 11, 2011

(51) Int. Cl.
*G06F 15/16* (2006.01)

(52) U.S. Cl.
USPC ............ 709/206; 709/207; 709/203; 455/410

(58) Field of Classification Search
CPC .... H04L 12/589; H04L 51/36; H04L 41/0206
USPC ........................... 709/206, 207, 203; 455/410
See application file for complete search history.

(56) References Cited

U.S. PATENT DOCUMENTS

| | | | |
|---|---|---|---|
| 6,976,092 B1* | 12/2005 | Daniell et al. | 709/246 |
| 8,204,937 B2* | 6/2012 | Blagsvedt et al. | 709/204 |
| 8,346,859 B2* | 1/2013 | Chang et al. | 709/203 |
| 2006/0101119 A1* | 5/2006 | Qureshi et al. | 709/206 |
| 2007/0226304 A1* | 9/2007 | Virk et al. | 709/206 |
| 2007/0250581 A1* | 10/2007 | Patel et al. | 709/206 |
| 2008/0232557 A1* | 9/2008 | Baird | 379/88.13 |
| 2009/0030998 A1* | 1/2009 | Blagsvedt et al. | 709/206 |
| 2010/0179999 A1* | 7/2010 | McCarthy et al. | 709/206 |
| 2011/0086613 A1* | 4/2011 | Doudkine et al. | 455/410 |
| 2012/0054291 A1* | 3/2012 | Roberts | 709/206 |

* cited by examiner

*Primary Examiner* — Michael C Lai (57) ABSTRACT

A system synchronizes digital messages from one user's multiple digital message accounts into one mailbox. The user identifies the message accounts from which digital messages are to be aggregated. When a new digital message arrives for one of the message accounts, a server providing the message-dependent storage sends an arrival notification to a synchronization system, or is accessed by the synchronization system at various points to check for message arrival, when notification is not forthcoming. Upon determining the arrival of a new digital message, the synchronization system retrieves the new digital message(s) and stores the retrieved message(s) in an integrated mailbox provided by the synchronization system, so that messages from various digital message accounts are collected into the integrated mailbox. This allows the user to manipulate messages in each of the individual accounts using the integrated mailbox without having to access the various accounts individually.

14 Claims, 7 Drawing Sheets

METHOD AND SYSTEM FOR SYNCHRONIZING MESSAGES ACROSS MULTIPLE DIGITAL MESSAGE ACCOUNTS

TECHNICAL FIELD

The present subject matter relates to techniques and equipment to aggregate various messages from one user's multiple digital message accounts provided by Internet Service Providers (ISPs) and/or portal service providers into one mailbox in real time.

BACKGROUND

In recent years, as landline and mobile communication technologies have developed, digital messages have taken various types, such as emails, Short Messaging Service (SMS) messages, Multimedia Messaging Service (MMS) messages, and Visual Voicemails (VVMs). Multiple email or message accounts with individual message mailboxes provided by various portals and Internet Service Providers (ISPs), e.g. Google, Yahoo, AOL, etc. are employed to take advantage of the different types of digital messages.

To check disparate email accounts, a user has to visit websites of the various portals and ISPs for the associated email accounts. Different user Identifications (IDs) and passwords are used to log in to the different email accounts, which is a cumbersome process at best. Moreover, accessing disparate email accounts by a mobile device consumes a significant amount of battery, leading to a reduction in device operating life between charging times for the mobile device. In particular, the mobile device establishes different connections to the individual portals/ISP to fetch messages in the portals/ISPs, a process that substantially impacts battery life and efficiency.

The user is able to access the respective email accounts using a single smartphone via respective interfaces provided by respective portals and ISPs. The smartphone still has to access different mail servers of the ISPs and portals to check emails or messages of the ISPs and portals. This remains a cumbersome process for the user even when using a single smartphone.

Moreover, the user repeatedly engages in the same activities in independently accessing the different email accounts in order to manage the email accounts. For example, if the user wants to filter out messages or emails from a specific sender, the user has to access email accounts of all ISPs and portals and set up a filter or otherwise individually eliminate for each account.

A need exists for a method and a system to aggregate emails and messages of a user from disparate accounts of various ISPs, various portals and the like in order to provide the user with a single unified message and email storage having the aggregated emails and messages. In addition, it is desirable to be able to manipulate the aggregated emails and messages using a single interface accessible by either mobile devices or personal computers, to enable the user to check and manage his or her digital messages via the single interface in real time.

SUMMARY

The teachings herein alleviate one or more of the above noted problems by aggregating user's digital messages from mailboxes or other storage of multiple digital message accounts. The teachings may provide a single integrated mailbox and/or a single user interface for accessing the aggregated messages.

An aspect of the disclosure relates to a method for synchronizing digital messages from multiple digital message accounts of a user. A group of digital message accounts provided by multiple message account providers is created from a user's entries of the on an electronic device. It is determined whether a new digital message has been received in storage for one of the digital message accounts. The new digital message is subsequently retrieved from the digital message account. The retrieved digital message is stored in an integrated mailbox provided by a synchronization server.

Independent of when a digital message is received, one or more of the multiple digital message accounts of the user are automatically or manually accessed at a predetermined time to check for arrival of a digital message. An alert of arrival of the digital message in the integrated mailbox is sent to a mobile device of the user, and the user accesses the integrated mailbox to check the digital message upon receiving the alert.

Another aspect of the disclosure relates to a system for synchronizing digital messages from multiple digital message accounts of a user. The multiple digital message accounts are provided by multiple message account service providers. A synchronization notification receiving server receives and forwards a notification of arrival of a digital message in one of the user's multiple digital message accounts provided by one of the multiple message account service providers. A synchronization engine server accesses the one of the user's multiple message accounts to retrieve the arrived digital message from the one of the user's multiple message account upon receiving the notification of arrival from the synchronization notification receiving server. A synchronization mail server stores the retrieved digital message in a user's integrated mailbox.

A synchronization server provides a web based interface or a mobile based interface via which the user registers the multiple message accounts and checks digital messages stored in the user's integrated mailbox. A synchronization poller accesses the multiple digital message accounts at a predetermined time and retrieving newly arrived digital messages from the multiple digital message accounts.

As a result, the user of multiple digital message accounts can check digital messages of the multiple digital message accounts at one integrated mailbox, without the need for accessing each of the multiple digital message accounts.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to synchronization of digital messages in one user's multiple digital message accounts into one integrated mailbox (also referred to herein as a unified mailbox). The user identifies the multiple message accounts from which digital messages are integrated and sent into the one mailbox. When a new digital message arrives at one of the multiple digital message accounts, a message account providing server for the one of the multiple digital message accounts send an arrival notification to a synchronization system. Alternatively, the synchronization system may periodically access storage of the multiple digital message accounts to check for arrival of any new digital message. Upon determining that a new digital message has arrived, the synchronization system retrieves any newly arrived digital messages from the account storage (s) and stores the retrieved messages in the one mailbox provided by the synchronization system. The multiple digital messages from one user's multiple digital message accounts are integrated into the one mailbox. The user can check digital messages of the multiple digital message accounts by checking the one mailbox without accessing the multiple digital message accounts respectively. Hence, the integrated mailbox can provide a unified interface for user access to the messages, e.g. from the user's mobile device, PC or the like.

Figure 1:
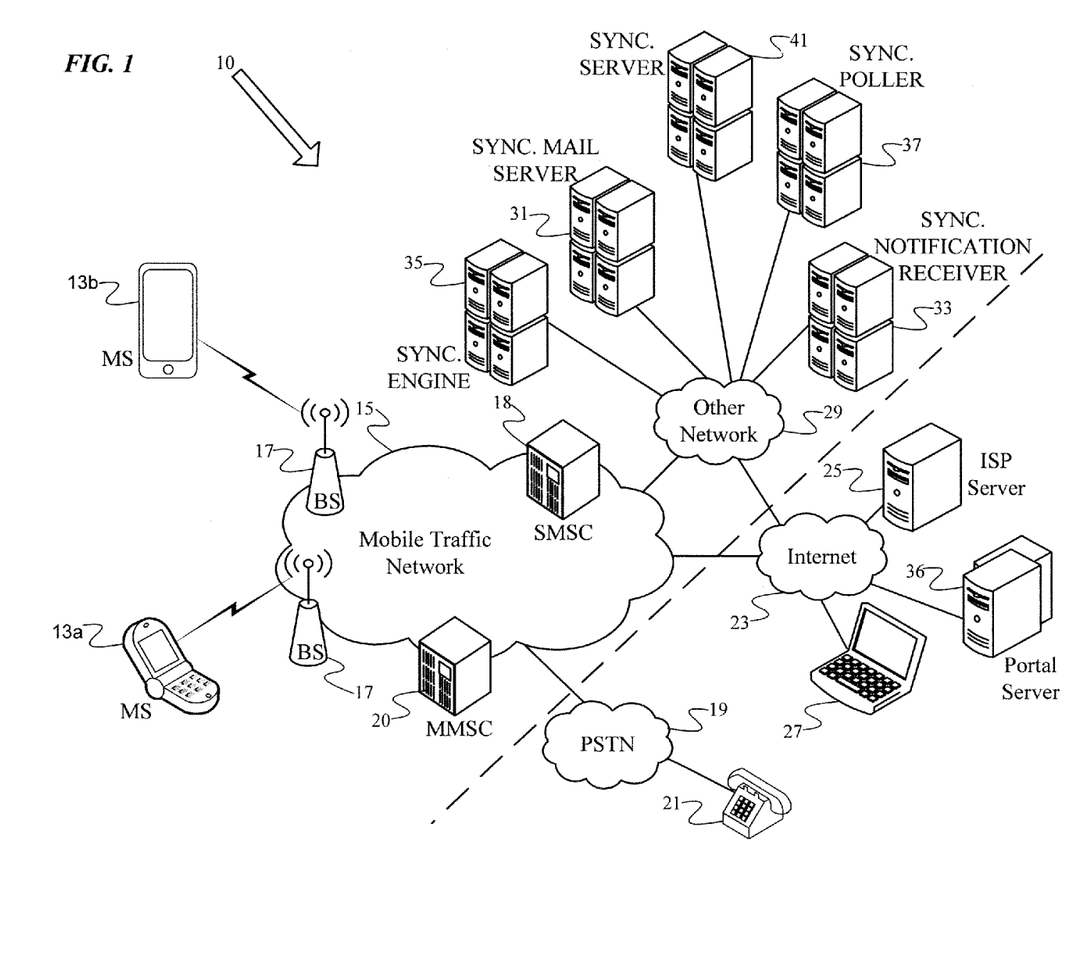
FIG. 1 illustrates a system of networks/devices that provide a variety of mobile communication services, including communications for a digital message synchronization service for mobile station users.

Reference now is made in detail to the examples illustrated in the accompanying drawings and discussed below. FIG. 1 illustrates a system 10 offering a variety of mobile communication services, including communications for a digital message synchronization service for mobile station users. The user may access messages collected into the integrated mailbox from a mobile device 13, a personal computer (PC) 27 or other terminal. The messages may come from various services and be initially received in storage of various types operated by different message service providers. Although synchronization could be offered by any of the service providers or other third parties, in the example, the synchronization is offered by the carrier or service provider operating the mobile wireless communication network that provides mobile devices to the mobile stations 13. Hence, the discussion of the example will proceed from the perspective of the users' mobile stations and the network, etc. operated by mobile communication service provider.

The example shows two mobile stations (MSs) 13a and 13b as well as a mobile communication network 15. The stations 13a and 13b are examples of mobile stations that may be used for the digital message synchronization service. However, the network will provide similar communications for many other similar users as well as for mobile devices/users that do not participate in the digital message synchronization service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may are capable of voice telephone communications through the network 15, and various messaging communications including the digital message synchronization services. The exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as various servers 25 and 36 connected to the Internet 23. The data services for the mobile stations 13 via the Internet 23 may be with devices like those shown at 25, 27 and 36 as well as with a variety of other types of devices or systems capable of data communications through various interconnected networks. In the examples, the servers 25 and 36 offer email or similar messaging services, which a user can access from their mobile device 13 or from a PC 27 or other terminal, of course, communications with servers like 25 and 36 will often support a range of other activities. The mobile stations 13a and 13b of users of the digital message synchronization service also can receive and execute applications written in various programming languages, as discussed more later.

Mobile stations 13 can take the form of portable handsets, smartphones or personal digital assistants or tablet devices, although they may be implemented in other form factors. Program applications, including an application to assist in the digital message synchronization service can be configured to execute on many different types of mobile stations 13. For example, a mobile station application can be written to execute on a binary runtime environment for mobile (BREWbased) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., PSTN and the Internet) either directly or indirectly.

The user obtains messaging services from users accounts with a number of different entities. For example a user may have an account with an Internet service provider (ISP), and email for that account is received, stored and delivered via a server such as the server 25 in our example. The same user may also have an email account with a portal service and email messages of that service account would be received, stored and delivered via one or more of the portal servers 36.

The carrier operating the network provides a number of digital messaging services for its customers, such as text messaging, multimedia messaging, voice mail and visual voice mail. For these purposes, the network operator will have various network connected storage devices. In the example, the carrier operates a short message service center (SMSC) 18 which stores SMS messages and forwards the stored SMS messages to a destination mobile device, and a multimedia messaging service center (MMSC) 20 which stores MMS messages and forwards the MMS messages to a destination mobile device.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31, 33, 35, 37, 41, some or all of required for delivering the digital message synchronization service, in this case to some or all of the carrier's mobile service customers.

A mobile station 13 communicates over the air with a base station 17 and through the traffic network 15 for various voice and data communications, e.g. through the Internet 23 with a server 25 and/or with application servers 31. If the mobile service carrier offers the digital message synchronization service, the service may be hosted on a carrier operated application server, for communication via the networks 15 and 29. Alternatively, the digital message synchronization service may be provided by a separate entity (alone or through agreements with the carrier), in which case, the service may be hosted on an application server such as server 25 or 36 connected for communication via the networks 15 and 23. Any server such as 25, 31 and 36 may provide any of a variety of common application or service functions in support of or in addition to an application program running on the mobile station 13. However, for purposes of further discussion, we will focus on functions thereof in support of the digital message synchronization service, in this case, where the synchronization service is provided by the network operator.

For a given service, including the digital message synchronization service, an application program within the mobile station may be considered as a 'client' and the programming at 25, 31, 33, 35, 37, 41 may be considered as the 'server' application for the particular service.

The enhanced digital message synchronization service under consideration here may be delivered to touch screen type mobile stations as well as to non-touch type mobile stations. PDAs, tablet devices and other mobile stations are encompassed by the present discussion although for convenience the drawing shows and further discussion will focus on touch type smartphones and non-touch type handsets. Hence, our simple example shows the mobile station 13a as a non-touch type mobile station and shows the mobile station 13 as a touch screen type mobile station. Implementation of the on-line synchronization service will involve at least some execution of programming in a user's device, e.g. in the mobile station, when accessing service via such a device, as well as implementation of user input/output functions and data communications through the network 15 and execution of server programming on the various network connected computers.

Multiple ISPs 25 or portals 36, such as AOL, Google, YAHOO, etc., provide an email and message service over the Internet or wireless network to personal computers or mobile devices. Each of the multiple ISPs or portals provides an email or other message account to each user. IDs and passwords for the same user usually vary according to the ISPs or portals. Some of the ISPs or portals provide an email notification service, which notifies user of an arrival of a new email or message, whereas some of the ISPs or portals do not.

Figure 2:
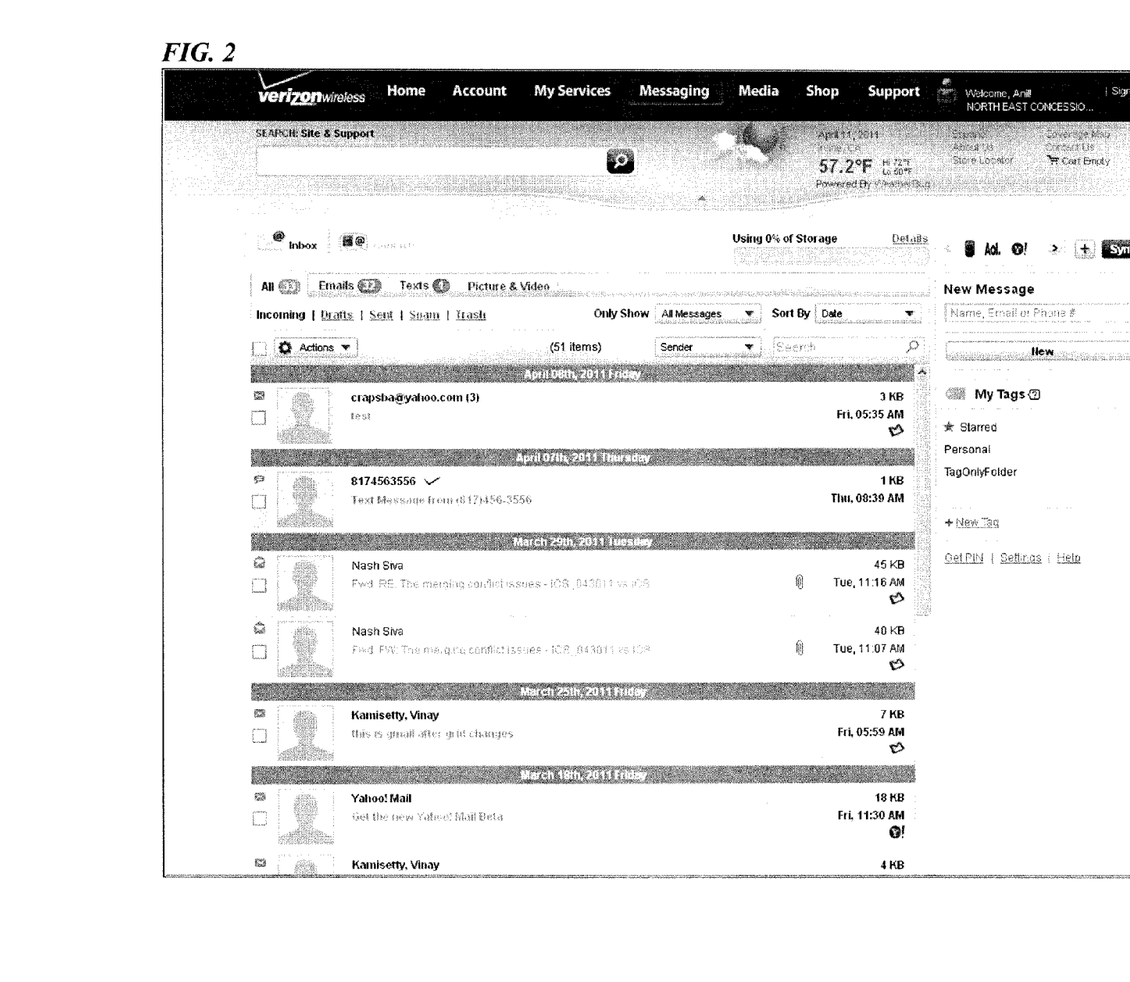
FIG. 2 is an example of the web-based interface provided by a synchronization server of FIG. 1.

A synchronization server 41 provides a web-based interface via which a user manages a unified email and other message mailbox. FIG. 2 is an example of the web-based interface. The web-based interface provides a unified mailbox, and the unified mailbox is a mailbox separate from mailboxes of the multiple ISPs 25 or portals 36 and provided by a wireless network carrier. As illustrated in FIG. 2, the emails or text messages from user's multiple ISPs or portals accounts are integrated into the unified mailbox. Via the web-based interface, the user can compose, read, reply, forward and tag (shown at the far right of FIG. 2) emails of the unified mailbox in a manner similar to operations of the individual mailboxes of the respective ISPs and portals.

The activities done by the user via the web-based interface are reflected in respective ISPs 25 or portals 36. Thus, for example when a particular email message is read using the unified mailbox, it appears as being read when later accessing the ISP/portal directly through an application for that ISP/portal. Similarly, when a particular email message is read using the application for a particular ISP/portal, it appears as being read when later accessing the ISP/portal through the unified mailbox. Synchronization of activities may be performed via the synchronization system or by using a specific ISP as a smart proxy.

In another example, when the user removes emails of the unified mailbox, a notification of removal of the message is generated at the synchronization server 41 and sent to the synchronization notification server 33. The synchronization notification is submitted to the synchronization engine 35. The synchronization engine 35 accesses the specific ISP or portal of the message removed and removes the message in the specific ISP or portal. When the user replies to (or composes or forwards) a message in the unified mailbox, the synchronization engine 35 serves as a smart proxy between the user's mobile device and a mail server of the specific ISP or portal of the message. The synchronization engine 35 accesses the mail server of the specific ISP or portal and causes the mail server to reflect the user's reply, an activity performed via the unified mailbox.

Similarly, a mobile interface implemented by an application residing in the mobile device 13 is provided on the mobile device during communications with the synchronization server 41. The mobile interface has the same form as the web-based interface in FIG. 2. The mobile interface allows the user of the mobile device 13 to the same management and addition/removal activities to the synchronization service as the web-based interface does.

Figure 3A:
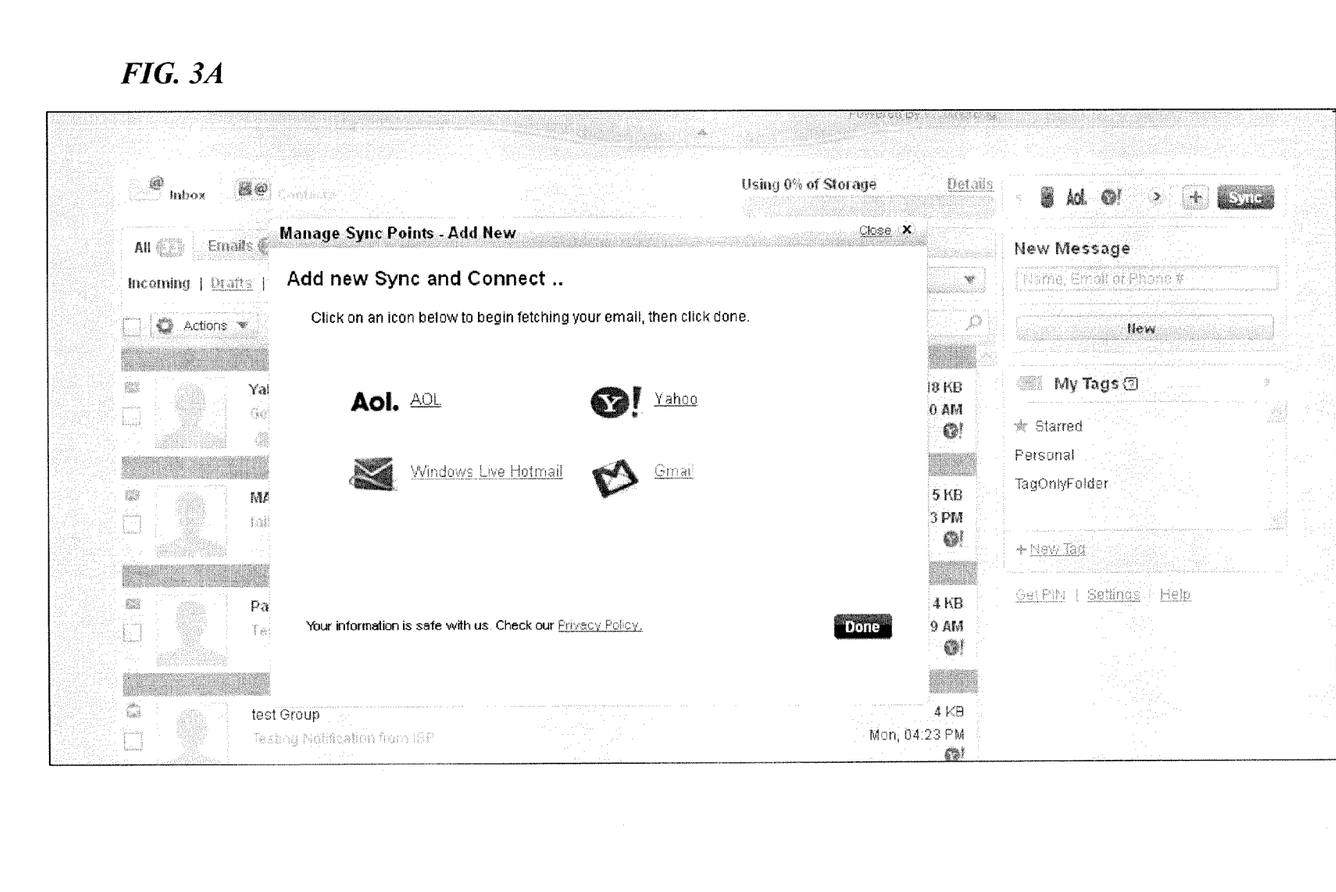
FIGS. 3A and 3B illustrate exemplary dialog boxes via which a user registers with a synchronization service.
Figure 3B:
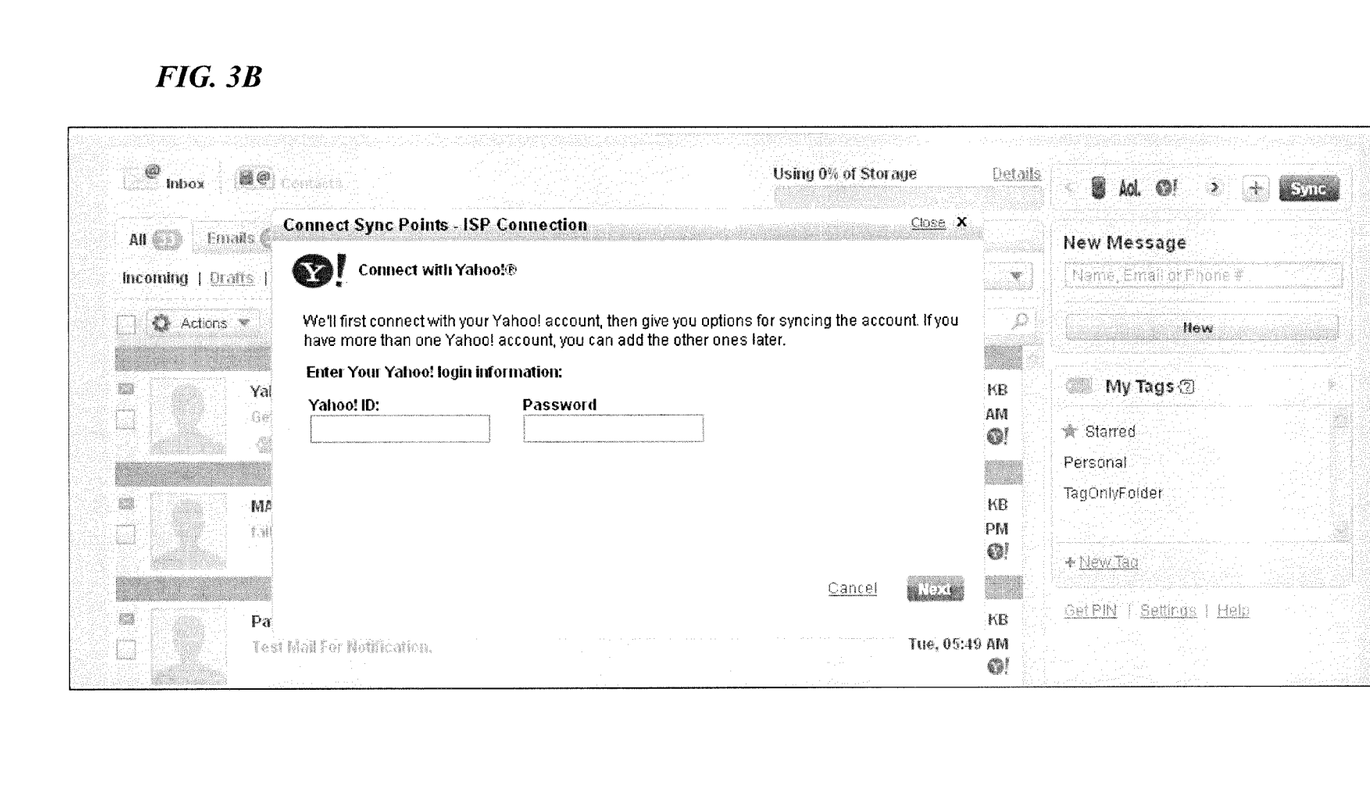

FIGS. 3A and 3B illustrate a dialog box via which the user removes or adds ISPs or portals from the synchronization service. The user selects ISPs or portals that he or she wants to add to or remove from the synchronization service via a dialog box of FIG. 3A. As disclosed in FIG. 3B, when adding ISPs or portals, the user provides his or her password and ID for the added ISP or portal via a dialog box. Once the ISP or portal is added to ISPs 25 or portals 36 that are subject to the synchronization service, the entered ID or password is stored and used to access the added ISP or portal to synchronize messages or emails from the added ISP or portal using the synchronization engine.

Among the ISPs 25 or portals 36 subject to the synchronization service, some of ISPs 25 or portals provide notification to the user upon the arrival of emails or messages while other do not provide such notification.

A synchronization mail server 31 stores a unified email and other message mailbox for each user. The server 31 fetches and stores emails, SMS/MMS messages from the centers 18, 20, voice messages and/or VVM messages from the registered multiple ISPs and portals, as well as emails. The user accesses the unified email and other message mailbox via the web-based interface and the mobile interface through computers or mobile devices upon receiving the notifications from the IPSs 25 or portals 36 or whenever the user wants to access. The synchronization mail server 31 may have a limit, such as 2 GB, on storage capacity for each unified mailbox. The size of the unified mailbox (number of bytes and/or relative to the limit) may be shown in the unified mailbox. For example, as shown in FIG. 2, this usage may be illustrated as a bar whose color changes dependent on percentage of limit (e.g., green if less than 75%, yellow if 75-90%, red above 90%). As the unified mailbox approaches the storage capacity limit, the synchronization mail server 31 may send an alert to the user. This alert, for example, requests the user to downsize his or her unified mailbox. If no action is taken, when the unified mailbox reaches the storage capacity limit, emails/messages may be automatically deleted from the unified mailbox (without being deleted from the ISP/portal) to establish a predetermined percentage of space in the unified mailbox. For example, the oldest emails/messages, those tagged in the unified mailbox as least important or of another predetermined category (e.g., from a particular source, using above a certain amount of space) may be eliminated to allow 5%, 10%, 20% etc. . . . of the storage capacity to be freed.

A synchronization notification receiver 33 receives new email or message notifications from ISPs or portals that provide an email notification service. The notifications may be sent to the synchronization notification receiver 33 immediately after arrival of new email or message, or periodically, for example, every 10 or 15 minutes. In response to each received notification or message, the receiver 33 submits a synchronization request to a synchronization engine 35 either immediately after receiving notifications or periodically after a predetermined time period. These time periods may be set individually for each account. For example, it may be desirable to notify and synchronize certain email/messages immediately (such as work-related), while the notification and/or synchronization for others (personal) may occur on a periodic basis.

The synchronization engine 35 synchronizes emails and messages of the external ISPs and portals with those of the single unified email and other message mailbox of the synchronization mail server 31 by fetching emails or messages from the storages of ISPs 25 or portals 36.

When ISPs 25 or portals 36 do not provide the notification service, arrival of new emails or messages cannot be known without checking user's email or message accounts of the ISPs 25 or portals 36 periodically or on the user's initiative. For the ISPs 25 or portals 36 that do not provide the notification service, a synchronization poller 37 accesses user's email or message accounts of the ISPs 25 or portals 36, and thereby checks arrival of new emails or messages in the accounts of the ISPs 25 or portals 36. In addition or instead of checking periodically, the synchronization poller 37 may be triggered by the notification/synchronization of ISPs 25 or portals 36 that provide notification service (either when an email/message is received or sent from the receiver 31).

Those skilled in the art presumably are familiar with the structure, programming and operations of the various type of mobile stations. However, for completeness, it may be useful to consider the functional elements/aspects of two exemplary mobile stations 13a and 13b, at a high-level.

Figure 4:
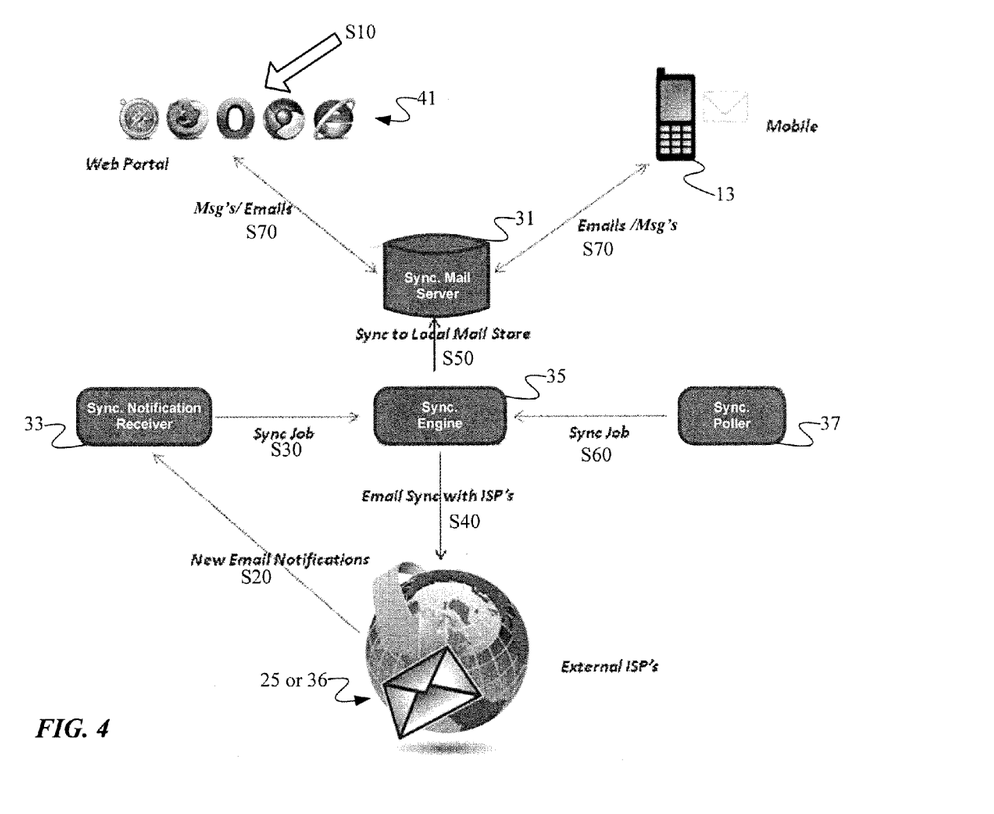
FIG. 4 is a diagram illustrating a process to aggregate digital messages from multiple digital message resources, including mail or message equipment of ISPs and portals, into an integrated mailbox.

FIG. 4 is a diagram illustrating a process to aggregate emails, SMS and MMS messages, voice messages and VVM messages from multiple resources including resources of the network operator and of third parties such as ISPs 25 and portals 36. As disclosed in FIG. 3A-3B, a user registers with the synchronization service via the web-based interface or the mobile interface. (S10) The user adds ISP accounts or accounts with portals or removes ISP or portal accounts, to create and maintain groups of ISPs 25 or portals 36 to be covered by the synchronization service. IDs and passwords for each ISP or portal are provided by the user during the registration, as disclosed in FIG. 3B. Once registered, the IDs and passwords for IPSs 25 or portals 36 may be maintained permanently until deleted by the user or may expire after a predetermined amount of time for security purposes. In the latter case, the time period may be set by the user or may be established due to network policy.

ISPs or portals 25 or 36, which provide the email or message notification service, upon arrival of new emails or messages, send notifications of this arrival to the synchronization notification receiver 33, upon arrival of the new emails or messages. (S20) Upon receiving the notifications from the ISPs 25 or portals 36, the synchronization notification receiver 33 submits a synchronization request including information (e.g. user's passwords and IDs of the ISPs 25 or portals 36 for accessing user's accounts of the ISPs 25 or portals 36) on the ISPs 25 or portals 365 sending the notifications to the synchronization engine 35. (S30)

Upon receipt of the synchronization request from the synchronization notification receiver 33, the synchronization engine 35 synchronizes the ISPs 25 or portals 36 that sent the recent notifications. That is, the synchronization engine 35 accesses the ISPs 25 or portals 36 that sent the notifications and retrieves newly arrived emails or messages from storage equipment of the ISPs 25 or portals 36. (S40) The retrieved emails or messages are sent to the synchronization mail server 31. (S50) The message protocols of the synchronization mail server 31 may differ from those of the respective ISPs 25 or portals 36. The ISPs 25 or portals 36 may have different message protocols, such as Internet message access protocol (IMAP), Post Office Protocol 3 (POP3), Simple Mail Transfer Protocol (SMTP), or MSP.

Some ISPs or portals do not provide the notification service to send notification of arrival of new emails or messages to the user. In that case, a synchronization poller 37 request synchronization and identifies the accounts to be polled. The poller 37 instructs the synchronization engine 35 to access the ISPs or portals that do not provide the notification service, periodically or randomly, and checks arrival of new emails or messages in the user's account of the ISPs 25 or portals 36. (S60)

The synchronization mail server 31 stores the received emails or other messages in the unified email and other message mailbox. Integration of emails or messages from the user's multiple ISP or portal accounts into the unified mailbox permits the user to check emails or messages of multiple ISP or portal accounts in one interface (the web-based interface or the mobile interface). (S70) The synchronization mail server 31 may send an alert of arrival of new messages in the unified mailbox to a mobile station of the user. Upon receipt of the alert, the user may access the unified mailbox via his or her mobile station or PC and checks the new message stored in the unified mailbox.

Figure 5:
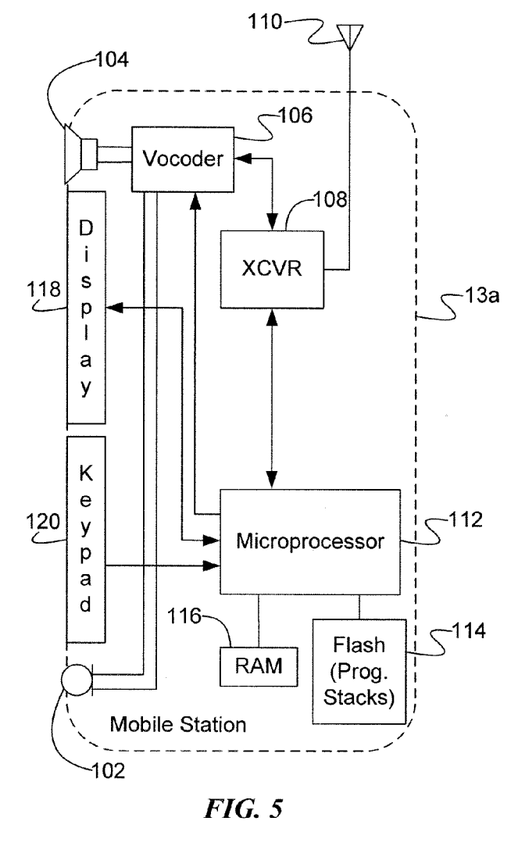
FIG. 5 is a high-level functional block diagram of an exemplary non-touch type mobile station as may utilize the digital message synchronization service through a network/system like that shown in FIG. 1.

For purposes of such a discussion, FIG. 5 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Presently, the handset 13a is configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., for the digital message synchronization service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the digital message synchronization service A microprocessor 112 serves as a programmable controller for the mobile station 13a, in that it controls all operations of the mobile station 13a in accordance with programming that it executes, for all normal operations, and for operations involved in the digital message synchronization procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing the digital message synchronization service.

Figure 6:
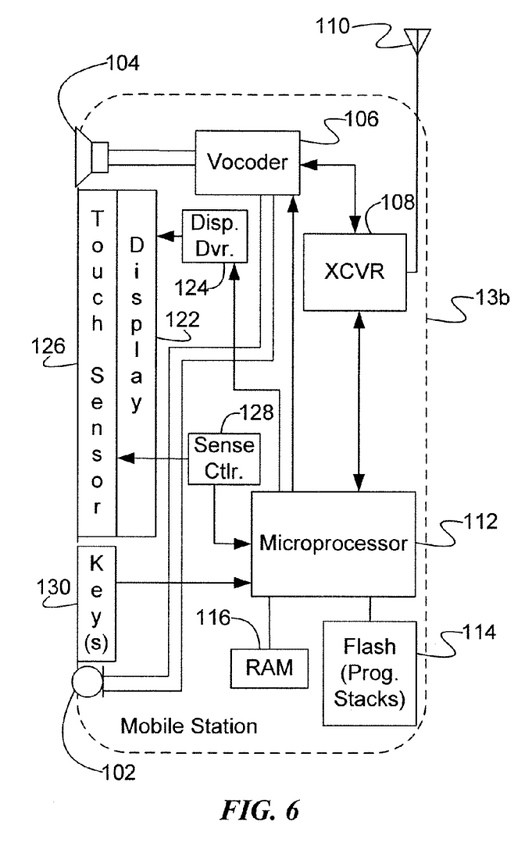
FIG. 6 is a high-level functional block diagram of an exemplary touch screen type mobile station as may utilize the digital message synchronization service through a network/system like that shown in FIG. 1.

For purposes of such a discussion, FIG. 4 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 4. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the digital message synchronization procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing the digital message synchronization service.

In the example of FIG. 6, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output.

The structure and operation of the mobile stations 13a and 13b, as outlined above, were described to by way of example, only.

As shown by the above discussion, functions relating to the an enhanced digital message synchronization experience, via a graphical user interface of a mobile station may be implemented on computers connected for data communication via the components of a packet data network, operating as the synchronization engine 35, the synchronization mail server 31, the synchronization server 41 as shown in FIG. 1. Although special purpose devices may be used, such devices also may be implemented using one or more hardware platforms intended to represent a general class of data processing device commonly used to run "server" programming so as to implement the digital message synchronization functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the digital message synchronization service. The software code is executable by the general-purpose computer that functions as the synchronization server and the synchronization engine and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for delivering the digital message synchronization service, in essentially the manner performed in the implementations discussed and illustrated herein.

Figures 7, 8:
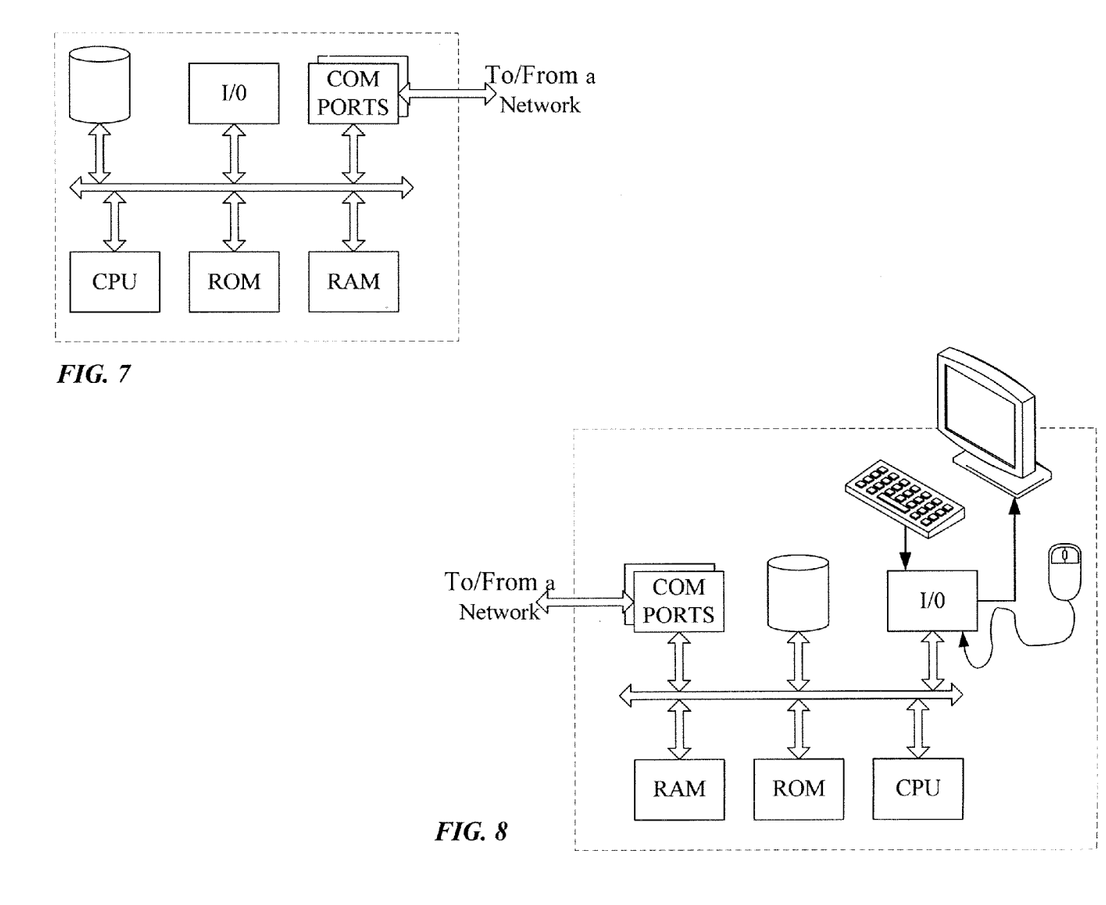
FIG. 7 a simplified functional block diagram of a computer that may be configured as a host or server, for example, to function as the synchronization mail server, the synchronization notification receiving server, the synchronization poller, the synchronization server and the synchronization engine in the system of FIG. 1.
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of the digital message synchronization outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the digital message synchronization service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the digital message synchronization service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for synchronizing digital messages from multiple digital message accounts of a user, the method comprising steps of:
   creating a group of a user's multiple digital message accounts provided by multiple message account providers, wherein:
      one of the providers maintains email messages in a first storage for at least one of the user's digital message accounts, and
      another of the providers maintains in a second storage associated with another of the user's digital message accounts for at least one of: Short Messaging Service (SMS) messages, Multimedia Messaging Service (MMS) messages, voicemails, and Visual Voicemails (VVMs);
   determining when a new digital message has been received in each storage for each of the multiple digital message accounts, by receiving by a synchronization notification receiving server, a notification from one of the digital message accounts that provides a notification service, and by polling by a synchronization poller one of the digital message accounts that does not provide a notification service;
   based on results of the determining step, retrieving, by a synchronization engine server, each new digital message from a respective one of the storages in response to each new digital message being received in storage;
   storing, by a synchronization mail server, retrieved digital messages in an integrated mailbox provided by the synchronization mail server, the integrated mailbox containing digital messages from the multiple digital message accounts which are accessed by a user device operated by the user, the digital messages including emails retrieved from the first storage and messages retrieved from the second storage that include at least one of: Short Messaging Service (SMS) messages, Multimedia Messaging Service (MMS) messages, voicemails, and Visual Voicemails (VVMs);
   providing, by a synchronization server, a web based user interface or a mobile based user interface via which the user registers the multiple digital message accounts and checks digital messages stored in the user's integrated mailbox; and
   retrieving new digital messages, by the synchronization engine server, after a predetermined amount of time from receiving the notification from the synchronization notification receiving server or from the synchronization poller, the predetermined amount of time being set individually for each digital message account.

2. The method of claim 1, wherein the polling comprises accessing storage for the one of the multiple digital message accounts of the user at a predetermined time to check for arrival of the new digital message for the one of the multiple digital message accounts.

3. The method of claim 1, further comprising steps of:
sending an alert of arrival of the new digital message in the integrated mailbox to a mobile device of the user; and
sending the new digital message to a device of the user, in response to the user accessing the integrated mailbox to check the new digital message upon receiving the alert.

4. The method of claim 1, wherein the multiple message account providers include two or more of: an Internet Service Provider (ISP), a web portal service provider, and a mobile network operator.

5. The method of claim 1, further comprising:
determining, that a user-initiated change has occurred, via the integrated mailbox, to a particular digital message of the one of the multiple digital message accounts;
accessing a specific storage of the one of the multiple digital message accounts; and reflecting the change in the specific storage.

6. The method of claim 5, wherein the change includes deletion, reading, composing, forwarding, replying, or tagging of the particular digital message.

7. The method of claim 1,
wherein the synchronization mail server includes a limit on storage capacity for the integrated mailbox.

8. The method of claim 7,
wherein as the storage in the integrated mailbox approaches the limit, the synchronization mail server sends an alert message to the user.

9. The method of claim 8, wherein if the user takes no action in response to the alert message, the synchronization mail server automatically deletes at least one message from the integrated mailbox.

10. A system for synchronizing digital messages from multiple digital message accounts of a user, the multiple digital message accounts being provided by multiple message account service providers, the system comprising:
a synchronization notification receiving server for receiving and forwarding a notification of arrival of a new digital message in storage of at least one of the multiple digital message accounts that provides a notification service,
a synchronization poller for accessing the storage of one or more of the multiple digital message accounts at a predetermined time and determining when there are newly arrived digital messages from each of the one or more of the multiple digital message accounts that does not provide a notification service, wherein:
one of the providers maintains email messages in a first storage for at least one of the user's digital message accounts, and
another of the providers maintains in a second storage associated with another of the user's digital message accounts for at least one of: Short Messaging Service (SMS) messages, Multimedia Messaging Service (MMS) messages, voicemails, and Visual Voicemails (VVMs);
a synchronization engine server for accessing each storage to retrieve each new digital message from each storage after receiving the notification of arrival from the synchronization notification receiving server or another notification of arrival from the synchronization poller;
a synchronization mail server for storing retrieved digital messages in an integrated mailbox, the integrated mailbox containing digital messages from the multiple digital message accounts which are accessed by a user device operated by the user, the digital messages including emails retrieved from the first storage and messages retrieved from the second storage that include at least one of: Short Messaging Service (SMS) messages, Multimedia Messaging Service (MMS) messages, voicemails, and Visual Voicemails (VVMs); and
a synchronization server for providing a web based user interface or a mobile based user interface via which the user registers the multiple digital message accounts and checks digital messages stored in the user's integrated mailbox,
wherein the synchronization engine server, after a predetermined amount of time from receiving the notification from the synchronization notification receiving server or from the synchronization poller, retrieves the newly arrived digital messages from the digital message accounts that provide the notification service, the predetermined amount of time being set individually for each digital message account.

11. The system of claim 10, wherein the synchronization engine server creates a list of the user's multiple digital message accounts provided by multiple message account providers from user's entries of the user's multiple digital message accounts on a mobile device.

12. The system of claim 10,
wherein the synchronization mail server includes a limit on storage capacity for the integrated mailbox.

13. The system of claim 12,
wherein as the storage in the integrated mailbox approaches the limit, the synchronization mail server sends an alert message to the user.

14. The system of claim 13, wherein if the user takes no action in response to the alert message, the synchronization mail server automatically deletes at least one message from the integrated mailbox.

\* \* \* \* \*